United States Patent [19]

Noro et al.

[11] Patent Number: 4,582,871

[45] Date of Patent: Apr. 15, 1986

[54] THERMOPLASTIC RESIN COMPOSITION

[75] Inventors: Masataka Noro; Takao Yazaki; Kazuhide Hattori; Satoru Hattori, all of Mie, Japan

[73] Assignee: Mitsubishi Petrochemical Co., Ltd., Tokyo, Japan

[21] Appl. No.: 681,386

[22] Filed: Dec. 13, 1984

[30] Foreign Application Priority Data

Dec. 21, 1983 [JP] Japan ................. 58-241494

[51] Int. Cl.$^4$ .......................... C08K 3/34; C08K 3/26; C08K 3/10; C08L 53/00
[52] U.S. Cl. ................................ 524/413; 524/417; 524/423; 524/425; 524/426; 524/427; 524/437; 524/451; 524/456; 524/505; 525/93; 525/95; 525/96; 525/98
[58] Field of Search ............. 524/451, 505, 423, 425, 524/426, 427, 417, 413, 456, 437; 525/93, 96, 98, 95

[56]  References Cited

U.S. PATENT DOCUMENTS

| | | | |
|---|---|---|---|
| 4,386,187 | 5/1983 | Grancio et al. | 525/96 |
| 4,386,188 | 5/1983 | Grancio et al. | 525/96 |
| 4,439,573 | 3/1984 | Fukui et al. | 524/505 |
| 4,480,065 | 10/1984 | Kawai et al. | 524/451 |

FOREIGN PATENT DOCUMENTS

| | | | |
|---|---|---|---|
| 0073033 | 5/1982 | Japan | 524/451 |
| 0073034 | 5/1982 | Japan | 524/451 |
| 0222132 | 12/1983 | Japan | 524/451 |

Primary Examiner—Herbert J. Lilling
Attorney, Agent, or Firm—Oblon, Fisher, Spivak, McClelland & Maier

[57]  ABSTRACT

A thermoplastic resin composition having a good balance between stiffness and impact resistance, a small degree of sagging of sheet during heating step in thermoforming and excellent deep drawing characteristics is disclosed. The composition comprises an olefin polymer composition, a styrene polymer, a thermoplastic styrene block copolymer rubber and an inorganic filler.

10 Claims, No Drawings

THERMOPLASTIC RESIN COMPOSITION

FIELD OF THE INVENTION

The present invention relates to a thermoplastic resin composition comprising specified components, which has an improved balance between stiffness and impact resistance, a small degree of sagging of sheet during heating step in thermoforming, a shortened heating time for shaping and a good deep drawing characteristic.

BACKGROUND OF THE INVENTION

Olefin polymers have excellent processing characteristics in various processing methods and also have excellent various characteristics such as mechanical properties (e.g., hardness, creep characteristics and abrasion resistance), appearance (e.g., surface gloss and transparency), chemical resistance and heat resistance. Further, the olefin polymers are relatively inexpensive. Accordingly, the olefin polymers have been widely used in the past.

Olefin polymers containing inorganic fillers to improve the stiffness and dimensional stability thereof are also widely used.

However, the olefin polymers have the disadvantages as compared to other amorphous resins such as styrene resins in the suitability for secondary processings such as vacuum forming and pressure forming which shape sheets obtained by, for example, extrusion molding into various shapes. For example, due to a large degree of sagging of a semi-molten sheet in the heating step, the sheet sagged contacts a heater to occur troubles, the producibility is poor due to a long heating time required for heating, and the molding condition ranges for shaping with a uniform thickness distribution are so narrow that use of the conventional vacuum forming machine is difficult. Thus, although the olefin polymers have various advantages described above, those cannot be used in some cases.

Japanese Patent Application (OPI) No. 28144/82 (published unexamined Japanese Patent Application) discloses blending a styrene resin with a polypropylene resin as the olefin polymer using a thermoplastic styrene block copolymer rubber as a compatibilizer. This method, however, has the following disadvantages. The impact resistance is improved as the amount of the styrene block copolymer rubber as a compatibilizer added increases, but the stiffness rapidly deteriorates. Even if an inorganic filler is added to supplement the deterioration, the stiffness is improved but the impact resistance rapidly deteriorates. As a result, the thermoplastic styrene block copolymer rubber must be further added to supplement the deterioration of the impact resistance, resulting in deterioration of the stiffness. Thus, good balance between stiffness and impact resistance cannot be obtained.

Therefore, with respect to the stiffness and impact resistance of the product shaped by this method, if the impact resistance is predominantly improved, deterioration of the stiffness is unavoidable. Further, with respect to the thermoforming property, improvement can be obtained as compared to a sheet obtained from an olefin polymer alone, but the molding condition ranges for shaping with a uniform thickness distribution are narrow and the heating time required for shaping is too long. Thus, the above method is practically unsatisfactory.

SUMMARY OF THE INVENTION

As a result of extensive investigations to overcome the disadvantages in the prior art, it has been found that a composition having various excellent effects can be obtained by using a specific olefin polymer composition and blending thereto specific amounts of styrene resin and thermoplastic styrene block copolymer rubber using a specific amount of an inorganic filler.

Accordingly, an object of the present invention is to provide a thermoplastic resin composition having an improved balance between stiffness and impact resistance, a small degree of sagging of sheet during heating step in thermoforming, a shortened heating temperature for shaping, wide molding condition ranges for shaping with a uniform thickness distribution and excellent deep drawing characteristics.

The thermoplastic resin composition according to the present invention comprises
 (a) 50 to 90% by weight of an olefin polymer composition containing 10 to 90% by weight of an ethylene polymer having a melt flow rate (MFR) of 3 g/10 min or less, a specific gravity of 0.930 or more and a Q value of 3 to 15 and 90 to 10% by weight of a crystalline propylene polymer having a MFR of 6 g/10 min or less and a Q value of 5 to 15;
 (b) 5 to 40% by weight of a styrene polymer;
 (c) 2 to 30% by weight of a thermoplastic styrene block copolymer rubber; and
 (d) 10 to 70% by weight of an inorganic filler.

Since the composition according to the present invention has the above-described excellent properties, the composition has a high practical value and greatly contributes to improvement of the practical technique.

DETAILED DESCRIPTION OF THE INVENTION

The ethylene polymer which can be used as one of Component (a) in the olefin polymer composition has a MFR of 3 g/10 min or less, a specific gravity of 0.930 or more and a Q value of 3 to 15. Examples of the ethylene polymer are an ethylene homopolymer, a copolymer of ethylene and at least one α-olefin selected from the group consisting of propylene, butene-1, 4-methylpentene-1, hexene-1 and octene-1, and mixtures thereof. The Q value used herein means a ratio of a number average molecular weight to a weight overage molecular weight.

The preferred examples of the ethylene polymer are an ethylene homopolymer, an ethylene/α-olefin copolymer containing 1 to 15% by weight of the α-olefin, and mixtures thereof, each having MFR of 2 g/10 min or less, a specific gravity of 0.940 or more and a Q value of 4 to 15.

If the MFR is more than 3 g/10 min, the drawdown at the molding becomes large. If the Q value is outside the above range, the drawdown at the molding becomes large and the impact resistance deteriorates. Further, if the specific gravity is less than 0.930, the stiffness is not sufficient.

The crystalline propylene polymer which can be used as other component in Component (a) has a MFR of 6 g/10 min or less and a Q value of 5 to 15. Examples of the crystalline propylene component are a propylene homopolymer, a copolymer of propylene and at least one α-olefin selected from the group consisting of ethylene, butene-1, 4-methylpentene-1, hexene-1 and octene-1, and mixtures thereof.

The preferred crystalline propylene polymers are a propylene/α-olefin copolymer containing 1 to 20% by weight of the α-olefin selected from the group consisting of ethylene, butene-1 and hexene-1, and mixtures thereof, each having a MFR of 3 g/10 min or less and a Q value of 8 to 15.

If the MFR is more than 6 g/10 min, the drawdown at the molding becomes large and the impact resistance deteriorates. Further, if the Q value is outside the above range, the same disadvantages as in the MFR occur.

The ethylene polymer and the crystalline propylene polymer are contained in Component (a) in amounts of 10 to 90% by weight and 90 to 10% by weight, respectively. The preferred amount of the ethylene polymer is 40 to 90% by weight and the preferred amount of the crystalline propylene polymer is 10 to 60% by weight. The effects of the present invention, particularly the improved balance between stiffness and impact resistance and the deep drawing characteristics, can be obtained within the above ranges.

If the mixing proportion of both polymer is outside the above range, the balance between stiffness and impact resistance and the deep drawing characteristics become poor.

Examples of the styrene polymer which can be used as Component (b) in the composition of the present invention are a polystyrene, an acrylonitrile/butadiene/styrene copolymer (ABS resin), an acrylonitrile/styrene copolymer (AS resin), a styrene/methyl methacrylate copolymer, a rubber blended polystyrene, a styrene/maleic anhydride copolymer, and mixtures thereof.

Examples of the thermoplastic styrene block copolymer rubber which can be used as Component (c) in the composition of the present invention are a styrene/butadiene/styrene block copolymer, a styrene/isoprene/styrene block copolymer and hydrogenated products thereof. The copolymer rubber can be used alone or in combinations thereof.

Examples of the inorganic filler which can be used as Component (a) in the composition of the present invention are talc, calcium carbonate, magnesium phosphate, aluminum hydroxide, barium sulfate, calcium silicate, calcium sulfate and titanium oxide. Of those fillers, talc is particularly preferred.

The mixing proportions of Components (a) to (d) are such that the olefin polymer composition (a) is 50 to 90% by weight, preferably 50 to 80% by weight, the styrene polymer (b) is 5 to 40% by weight, preferably 10 to 30% by weight, the thermoplastic styrene block copolymer rubber (c) is 2 to 30% by weight, preferably 4 to 20% by weight, and the inorganic filler (d) is 10 to 70% by weight, preferably 15 to 40% by weight, all being based on the total weight of Components (a) to (d).

If the amount of Component (a) is less than 50% by weight, excellent properties such as oil resistance and heat resistance inherently possessed by the olefin polymer are lost.

If the amount of Component (b) is less than 5% by weight, the above-described improvement effects in thermoforming, such as vacuum forming are not sufficient, and if the amount thereof is more than 40% by weight, the impact resistance deteriorates.

If the amount of Component (c) is less than 2% by weight, the impact resistance is not sufficient, and if the amount thereof is more than 30% by weight, the stiffness is not sufficient.

If the amount of Component (d) is less than 10% by weight, the stiffness is not sufficient, and if the amount thereof is more than 70% by weight, the impact resistance is not sufficient.

If desired and necessary, the composition according to the present invention may contain various additives such as stabilizers, coloring agents, lubricants, nucleating agents and antistatic agents, as additional components.

Although the composition (blend) according to the present invention can be obtained by directly dry blending the components and then molding, the composition is generally obtained by the method comprising melt kneading the components with a conventional kneader such as a roll, banbury mixer or an extruder to obtain a molten mixture and then molding the resulting mixture.

One of the applications of the composition comprises shaping the composition into a sheet and heat molding the resulting sheet. This includes two embodiments, one being using a single molded layer of the composition of the present invention and other being using a laminate wherein the conventional polypropylene layer is laminated on at least one surface of the layer comprising the composition of the present invention. The thickness ratio in the laminate is such that the thickness of the conventional polypropylene layer is preferably up to 20% of the total thickness of the laminate in order not to deteriorate the excellent thermoforming property of the sheet comprising the composition of the present invention.

The lamination method include a method comprising heating, melting and kneading each layer composition in a separate extruder, joining those layer compositions in one die and co-extruding those, and a method comprising molding the composition of the present invention into a mono-layer sheet and melt extruding the polypropylene on the sheet.

The evaluation methods in the following examples are as follows.

(1) Three point bending modulus

According to JIS K7203.

(2) Izod impact strength

According to JIS K7110.

(3) Vacuum forming property

A sheet is interposed between two steel plates with a hole having a diameter of 150 mm at the center thereof and then horizontally placed in a heat insulating box. In a method of heating the sheet from the upper surface of the steel plate with a heater maintained at 455° C. at a distance of 10 cm from the sheet surface, a semispherical plug having a diameter of 80 mm is placed on the surface of the heated sheet so as to penetrate at a depth of 150 mm from the horizontal surface of the sheet and when the depth reaches 135 mm, the drawing ratio (drawing depth/drawing diameter) becomes 0.9. The heating time of the sheet required to reach this value is represented by $T_2$ (seconds). After $T_2$, there is the heating time region most suitable for shaping at which the drawing ratio is 1.0 and the whole sheet drawn becomes a uniform thickness. Such a heating time is represented by $T_3$ (seconds).

Therefore, $T_2$ can be considered as the time which is possible to initiate the vacuum forming. It is preferred that $T_2$ is shorter and the degree of sagging at $T_2$ is smaller. Further, if the time of from $T_2$ to $T_3$ is long, the forming range is wide and a deep draw forming can be easily conducted.

The present invention will be now explained in greater detail by reference to the following examples, but is not limited thereto.

EXAMPLE 1

Each of the blends having the compositions shown in Table 1 below was previously melt kneaded in an extruder. The resulting molten mixture was molded into a sheet having a thickness of 1.7 mm using an extruder having a diameter of 90 mm at a resin temperature of 220° C. and a processing speed of 1.4 m/min.

The evaluation results of the sheet are shown in Table 1 below.

EXAMPLE 2

Using the blends shown in Table 2 below, sheets were prepared in the same manner as in Example 1.

The evaluation results are shown in Table 2 below.

TABLE 2

| | Blend | | | | | Three Point Bending Modulus | | Izod Impact Strength | |
|---|---|---|---|---|---|---|---|---|---|
| Run No. | Poly-ethylene*4 (wt %) | Propylene Copolymer*5 (wt %) | DIAREX HH102 (wt %) | TUFPRENE (wt %) | Talc (wt %) | Longitudinal (Kg/cm²) | Transverse (Kg/cm²) | Longitudinal (Kg · cm/cm) | Transverse (Kg · cm/cm) |
| 10 | 40 | 26 | 10 | 4 | 20 | 27,000 | 25,000 | 23 | 16 |
| 11 | 30 | 20 | 36 | 4 | 10 | 24,000 | 17,000 | 15 | 10 |
| 12 | 30 | 20 | 8 | 2 | 40 | 31,000 | 30,000 | 10 | 8 |
| 13 | 30 | 20 | 10 | 10 | 30 | 20,500 | 20,000 | 28 | 17 |
| 14 | 28.6 | 27.4 | 20 | 4 | 20 | 23,500 | 21,500 | 17 | 12 |
| 15 | 39.2 | 16.8 | 20 | 4 | 20 | 21,000 | 21,000 | 16.5 | 11 |
| 16 | 44.8 | 11.2 | 20 | 4 | 20 | 21,000 | 20,500 | 13.5 | 12 |
| 17 | 50.4 | 5.6 | 20 | 4 | 20 | 24,500 | 20,000 | 13 | 10 |
| 18 | 5.6 | 50.4 | 20 | 4 | 20 | 24,500 | 20,000 | 9 | 6 |

Notes
*4MRF: 0.6 g/10 min, specific gravity: 0.95 and Q value: 5
*5MFR: 0.5 g/10 min, ethylene content: 5 wt % and Q value: 11

EXAMPLE 3

The blend shown in Table 3 below was melt kneaded with an extruder and the mixture was further kneaded with an extruder (diameter: 90 mm) at 220° C.

Polypropylene (MFR: 2.3 g/10 min) was kneaded with an extruder (diameter: 65 mm) at 220° C.

The above two molten mixtures were supplied into a die and molded into a laminate sheet at a die temperature of 220° C. and a processing speed of 1.4 m/min in the manner such that the propylene was two surface layer in each thickness of 0.09 mm and the blend was an intermediate layer in a thickness of 1.62 mm.

The evaluation results are shown in Table 3 below.

TABLE 1

| | Polyethylene | | | | Propylene Polymer | | | | Polystyrene*2 | | Copolymer*3 | Talc |
|---|---|---|---|---|---|---|---|---|---|---|---|---|
| Run No. | MFR (g/10 min) | Specific Gravity | Q Value | Amount (wt %) | MFR (g/10 min) | Ethylene Content (wt %) | Q Value | Amount (wt %) | Grade | Amount (wt %) | Amount (wt %) | Amount (wt %) |
| 1 | 0.6 | 0.95 | 5 | 34 | 0.5 | 5.0 | 11 | 22 | HT516 | 20 | 4 | 20 |
| 2*1 | — | — | — | — | 1.2 | 10 | 13 | 75 | — | — | — | 25 |
| 3*1 | — | — | — | — | 0.5 | 5.0 | 11 | 51 | HT516 | 20 | 4 | 25 |
| 4*1 | — | — | — | — | 0.5 | 5.0 | 11 | 49 | HT516 | 20 | 6 | 25 |
| 5*1 | — | — | — | — | 1.2 | — | 5 | 49 | HT516 | 20 | 6 | 25 |
| 6 | 0.6 | 0.95 | 5 | 31 | 0.5 | 5.0 | 11 | 20 | HT516 | 20 | 4 | 25 |
| 7 | 0.6 | 0.95 | 5 | 31 | 0.5 | 5.0 | 11 | 20 | HH102 | 17 | 7 | 25 |
| 8 | 0.6 | 0.95 | 5 | 31 | 0.5 | 5.0 | 11 | 20 | HH102 | 25 | 4 | 20 |
| 9*1 | 0.6 | 0.95 | 5 | 49 | — | — | — | — | HT516 | 20 | 6 | 25 |

| | Three Point Bending Modulus | | Izod Impact Strength | | Vacuum Forming Property | | |
|---|---|---|---|---|---|---|---|
| Run No. | Longitudinal (Kg/cm²) | Transverse (Kg/cm²) | Longitudinal (Kg · cm/cm) | Transverse (Kg · cm/cm) | $T_2$ (second) | Degree of Sagging at $T_2$ (mm) | $T_3-T_2$ (second) |
| 1 | 23,000 | 22,000 | 20 | 11 | 85 | 2.7 | 30 |
| 2*1 | 28,000 | 22,000 | 12 | 10 | 100 | 3.0 | 5 |
| 3*1 | 26,000 | 20,000 | 5.0 | 3.0 | 95 | 3.0 | 15 |
| 4*1 | 23,000 | 16,000 | 6.5 | 4.5 | 90 | 3.0 | 15 |
| 5*1 | 23,000 | 17,000 | 5.0 | 3.5 | 90 | 6.4 | 20 |
| 6 | 24,500 | 24,000 | 18 | 10 | 80 | 2.5 | 35 |
| 7 | 24,000 | 20,000 | 17 | 14 | 75 | 2.0 | 35 |
| 8 | 27,000 | 25,000 | 11 | 9 | 70 | 2.0 | 40 |
| 9*1 | 16,000 | 15,000 | 10 | 7 | 80 | 2.5 | 30 |

Notes
*1Comparative Example
*2Tradename "DIAREX", a product by Mitsubishi Monsanto Co.
*3Styrene-butadiene-styrene block copolymer, tradename "TUFPRENE", a product by Asahi Kasei Kogyo K.K.

TABLE 3

| | Blend | | | | | Three Point Bending Modulus | | Izod Impact Strength | |
|---|---|---|---|---|---|---|---|---|---|
| Run No. | Poly-ethylene*4 (wt %) | Propylene Polymer*5 (wt %) | DIAREX HH102 (wt %) | TUFPRENE (wt %) | Talc (wt %) | Longitudinal (Kg/cm$^2$) | Transverse (Kg/cm$^2$) | Longitudinal (Kg · cm/cm) | Transverse (Kg · cm/cm) |
| 19 | 34 | 22 | 15 | 4 | 20 | 22,000 | 21,500 | 12 | 14.5 |

*4 and *5 The same as defined in Table 2

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition, comprising:
   (a) 50 to 90% by weight of an olefin polymer composition comprising 10 to 90% by weight of an ethylene polymer having a melt flow rate of no more than 3 g/10, a specific gravity of at least 0.930 and a Q value of 3 to 15 and 90 to 10% by weight of a crystalline propylene polymer having a melt flow rate of no more than 6 g/10 min and a Q value of 5 to 15;
   (b) 5 to 40% by weight of a styrene polymer selected from the group consisting of polystyrene, an acrylonitrile/butadiene/styrene copolymer (ABS resin), an acrylonitrile/styrene copolymer (AS resin), a styrene/methyl methacrylate copolymer, a rubber blended polystyrene, a styrene/maleic anhydride copolymer and mixtures thereof;
   (c) 2 to 30% by weight of a thermoplastic styrene block copolymer rubber; and
   (d) 10 to 70% by weight of an inorganic filler, the total amount of (a)+(b)+(c)+(d) being 100% by weight of the composition.

2. The composition of claim 1, wherein the ethylene polymer is selected from the group consisting of an ethylene homopolymer, an ethylene/α-olefin copolymer containing 1 to 15% by weight of a α-olefin and mixtures thereof, each of said ethylene polymers having a melt flow rate of no more than 2 g/10 min, a specific gravity of at least 0.940 and a Q value of 4 to 15.

3. The composition of claim 2, wherein said olefin component of said ethylene/α-olefin copolymer is a member selected from the group consisting of propylene, butene-1, 4-methylpentene-1, hexane-1, octene-1, and mixtures thereof.

4. The composition of claim 1, wherein said propylene polymer is a propylene/α-olefin copolymer, wherein said α-olefin is selected from the group consisting of ethylene, butene-1, 4-methylpentene-1, hexene-1, octene-1 and mixtures thereof.

5. The composition of claim 4, wherein the propylene polymer is a propylene/α-olefin copolymer containing 1 to 20% by weight of an α-olefin selected from the group consisting of ethylene, butene-1, hexene-1 and mixtures thereof, which has a melt flow rate of no more than 3 g/10 min and a Q value of 8 to 15.

6. The composition of claim 1, wherein the amount of the ethylene polymer is 40 to 90% by weight and the amount of the crystalline propylene polymer is 10 to 60% by weight.

7. The composition of claim 1, wherein said thermoplastic styrene block copolymer rubber is a styrene/butadiene/styrene block copolymer, a styrene/isoprene/styrene block copolymer, or hydrogenated products thereof.

8. The composition of claim 1, wherein said inorganic filler is a member selected from the group consisting of talc, calcium carbonate, magnesium phosphate, aluminum hydroxide, barium sulfate, calcium silicate, calcium sulfate and titanium oxide.

9. The composition of claim 8, wherein said inorganic filler is talc.

10. The composition of claim 1, wherein the amount of component (a) is 50 to 80% by weight of the composition, component (b) is 10 to 30% by weight of the composition, component (c) is 4 to 20% by weight of the composition, and component (d) is 15 to 40% by weight of the composition.

* * * * *